United States Patent [19]
Reeves

[11] Patent Number: 5,097,924
[45] Date of Patent: Mar. 24, 1992

[54] MUFFLER FOR A COMPRESSED AIR DRIVEN MOTOR

[75] Inventor: ERic Reeves, Culver City, Calif.

[73] Assignee: McNeil (Ohio) Corporation, St. Paul, Minn.

[21] Appl. No.: 347,738

[22] Filed: May 5, 1989

Related U.S. Application Data

[63] Continuation-in-part of Ser. No. 204,005, Jun. 8, 1988, abandoned.

[51] Int. Cl.$^5$ .................................................. F01N 1/24
[52] U.S. Cl. ..................................... 181/230; 181/239; 181/243; 181/258; 55/276
[58] Field of Search ............... 181/230, 239, 243, 258, 181/231; 55/276, 319, 332, 392, 396, DIG. 21, 25, 30

[56] References Cited

U.S. PATENT DOCUMENTS

| | | | |
|---|---|---|---|
| 2,907,405 | 10/1959 | Marshall | 55/276 X |
| 2,975,854 | 3/1961 | Bakke et al. | 181/239 |
| 3,497,031 | 2/1970 | Kedziora | |
| 3,672,465 | 6/1972 | Blatt et al. | 181/258 |
| 3,687,224 | 8/1972 | Lundin | |
| 3,842,932 | 10/1974 | Gibel | |
| 3,863,733 | 2/1975 | Raudman, Jr. et al. | |
| 4,082,160 | 4/1978 | Schilling et al. | 181/230 X |
| 4,135,602 | 1/1979 | Clark | 181/230 |
| 4,205,732 | 6/1980 | Auerbach et al. | 181/230 |
| 4,258,798 | 3/1981 | Campbell et al. | 181/230 X |
| 4,286,976 | 9/1981 | Eriksson | 181/258 X |
| 4,424,883 | 1/1984 | Musiani | 55/276 X |
| 4,634,459 | 1/1987 | Pischinger et al. | 55/DIG. 30 X |

Primary Examiner—Benjamin R. Fuller
Assistant Examiner—Randy W. Gibson
Attorney, Agent, or Firm—Rogers, Howell & Haferkamp

[57] ABSTRACT

A sound absorbing muffler for a compressed air driven motor has first and second mutually confronting end walls connected by four side walls. A pad of sound absorbing material constructed from SAE No. F-7 polyester felt is contained in the muffler housing. An entrance port at the center of the first end wall supplies exhaust to the interior volume of the muffler housing. A series of depressions in the first end wall disperse the exhaust over a first planar surface of the pad of sound absorbing material. The porosity of the sound absorbing material permits the exhaust along with grease, oil or water carried by the exhaust to pass through the pad. The exhaust exits a second planar surface of the pad at the second end wall of the muffler housing and is discharged from the interior volume of the muffler housing through a plurality of louvers provided in the second wall of the muffler housing. The sound absorbing muffler provides a compact muffler of reduced size that adequately silences the exhaust of the air motor and does not appreciably restrict the flow of the exhaust through the muffler.

13 Claims, 2 Drawing Sheets

MUFFLER FOR A COMPRESSED AIR DRIVEN MOTOR

This application is a continuation in part of the parent application Ser. No. 07/204,005, filed June 8, 1988, abandon.

BACKGROUND OF THE INVENTION

(1) Field of the Invention

The present invention relates to a sound absorbing muffler for silencing the exhaust of a compressed air driven motor.

(2) Description of the Related Art

Sound absorbing mufflers of the type provided by the present invention are commonly used on reciprocating air motors that drive reciprocating fluid pumps. Generally, these types of air motors comprise a cylinder housing containing a reciprocating piston. A piston rod extends from one end of the cylinder housing and is connected to the reciprocating pump. A valve mechanism alternately supplies compressed air to opposite sides of the piston of the motor to reciprocate the piston and the piston rod extending from the cylinder housing of the air motor. The reciprocating movement of the piston rod drives the reciprocating pump. The valve mechanism and the piston of the air motor are both lubricated with grease and/or oil.

The air motor and pump assembly of this type is frequently used in confined work areas where the amount of available space for accommodating the air motor and the pump is very limited. In such an environment, the muffler of the air motor must be large enough to contain sufficient sound absorbing material to adequately silence the exhaust of the air motor. However, the muffler cannot be so large that it interferes with the installation of the air motor and pump in the intended working environment.

Another disadvantage associated with the larger prior art mufflers is that they protrude from the housing structure of the air motor. These larger mufflers at times protrude from the operative environment of the air motor and pump into an adjacent work area where they can come into contact with other machinery and be damaged or prevent their installation altogether.

The optimum air motor muffler would be as small and inobtrusive as possible, while adequately silencing the exhaust of the air motor. However, these are not the only characteristics considered in developing the optimum air motor muffler design. For example, in order for the muffler to adequately silence the exhaust from the air motor, it may be necessary to pass the exhaust through a sound absorbing material contained in the muffler. Some materials known for their sound absorbing properties that have been used in some air motor mufflers and in applications other than mufflers for air motors include sintered powdered metal, open cell plastic, corrugated paper, glass fiber, and foam rubber. During operation of the air motor however, it is possible for some of the grease and oil lubricating the valve mechanism of the air motor, and some condensed water that will often be supplied to the air motor along with the pressurized air, to be exhausted along with the air motor exhaust into the muffler. This creates the problem that the grease, oil or water exhausted from the air motor will not pass through some sound absorbing materials, but will be trapped in and absorbed by the sound absorbing material contained in the muffler. This could cause the material to swell up as it absorbs the grease, oil or water, and cause the pores of the material to decrease in size or clog due to small pore size, resulting in a decrease in the overall porosity of the sound absorbing material. This is especially true of foam rubber, one of the most efficient materials at absorbing sound. The decrease in the porosity of the material from the absorption of the grease, oil or water carried by the air motor exhaust will increase the resistance of the material to the flow of exhaust through the material. This, in turn, will decrease the efficiency of the air motor operation and cause increasing amounts of grease, oil and water exhausted from the air motor to be trapped in the muffler.

In addition, should foam rubber or a similar spongy material be used as the sound absorbing material in the muffler, as the material absorbs increasing amounts of grease, oil and water exhausted from the air motor, the resistance of the material to the flow of exhaust through the material increases. The material's increasing resistance to exhaust flow causes the exhaust supplied to the muffler to exert an increasing compressive force on the material. In spongy materials, this tends to compress the clogged material and further decreases its porosity. The further decrease in the material's porosity results in a further increase in the resistance of the material to the flow of exhaust through the material, and a further decrease in the efficiency of the air motor's operation.

Although there is a need for an air motor muffler having reduced physical dimensions to avoid the drawbacks of interfering with the installation of the air motor and pump assembly in its intended working environment, there are also drawbacks involved in limiting the size of the muffler. These drawbacks include the corresponding reduction in the amount of sound absorbing material that can be used in a smaller muffler and its effectiveness in silencing the exhaust of the air motor, and the increased likelihood that grease, oil or water exhausted from an air motor will clog the reduced volume of sound absorbing material. In order for a small volume of sound absorbing material to absorb the sound of a larger volume of sound absorbing material, the number of pores per unit volume for the small volume must be increased. Correspondingly, with an increase in the number of pores per unit volume, the size of the pores must decrease. This increases the number of exhaust flow pathways through the material, but decreases the size of the pathways. Should a material similar to the previously listed materials be used as the sound absorbing material in the air motor muffler (e.g. sintered powdered metal, open cell plastic, corrugated paper, glass fibers, foam rubber) the decreased pore size would result in an increased likelihood that grease, oil or water exhausted into the material will clog the pores, and/or will cause the material to swell, further decreasing the pore size and restricting exhaust flow through the material. As described earlier, should a pad of foam rubber, a very efficient sound absorber, be used in a smaller muffler as the sound absorbing material, as it begins to clog and resist exhaust flow through the pad the force of the exhaust on the pad will tend to compress the pad. This compression will, in turn, further restrict the flow of exhaust through the pad.

It is therefore an object of the present invention to achieve the aim of reducing the physical dimensions of a muffler for an air driven motor, while also overcoming the drawbacks of the reduced volume of sound absorbing material absorbing less sound and restricting the flow of exhaust through the material. The objectives are achieved by providing a muffler with a substantially reduced size that permits it to be incorporated into the housing of the air motor and does not interfere with the installation of the air motor and pump assembly in its working environment. The muffler housing contains features that enhance the unrestricted flow of exhaust through the muffler. The muffler contains a pad of sound absorbing material that, despite its reduced size, adequately absorbs sound and conforms to noise standards set by OSHA with an added factor of safety. The pad does not restrict the flow of grease, oil or water exhausted into the material from passing through the pad, and does not appreciably swell or absorb the grease, oil or water exhausted into the pad. The pad material is also semi-rigid, and contributes to avoiding any compression due to high exhaust pressure which would decrease the pore size of the pad should a portion of the pad become clogged.

SUMMARY OF THE INVENTION

The air motor sound absorbing muffler of the present invention has a reduced physical size compared to the existing sound absorbing mufflers in the prior art. The muffler also has a correspondingly smaller pad of sound absorbing material that is dimensioned to adequately absorb sound and conform to OSHA noise standards with an added factor of safety. The pad does not appreciably restrict the flow of exhaust through the pad even when the pad is subjected to grease, oil or water exhausted into the pad from the air motor.

The air motor muffler of the present invention comprises a muffler housing that can be retrofitted to existing air motors, but in the preferred embodiment is formed integrally with the housing of the air motor. The muffler housing has a rectangular configuration with a first end wall and a second open end. Four side walls are connected to a peripheral edge of the first end wall and together with the first end wall they form the interior volume of the muffler housing.

The interior volume of the muffler housing is enclosed by a louvered cover member releasably secured to the second open end of the muffler housing. The cover is releasably secured to the housing by a pair of screws. The louvers in the cover member permit the silenced air motor exhaust to escape from the interior volume of the muffler housing and direct the escaping exhaust along with the grease, oil or water exhausted through the muffler in an angular direction downward from the cover member.

An entrance port is provided in the first end wall of the housing. The entrance port is arranged to receive and direct exhaust from the air motor into the interior volume of the muffler housing in a flow path that is perpendicular to the first end wall. A circular depression in the first end wall surrounds the entrance port. A plurality of additional depressions are provided in the first end wall. The plurality of depressions extend radially from the circular depression surrounding the entrance port to the peripheral edge of the first end wall. A series of spoked ridges are also provided on the first end wall. The spoked ridges also extend radially from the circular depression to the peripheral edge of the end wall and separate the plurality of radial depressions in the end wall from one another.

A pad of sound absorbing material is contained in the interior volume of the muffler housing formed by the end wall and the four side walls and enclosed by the louvered cover. The pad of sound absorbing material is dimensioned to just fill the enclosed interior volume of the muffler housing without compressing the pad. The pad has a rectangular configuration that conforms to the rectangular configuration of the interior surfaces of the four side walls of the muffler housing. The pad also has a thickness chosen so that a first surface of the pad inserted into the interior volume of the muffler housing confronts the first end wall, and a second pad surface, parallel to the first pad surface, confronts the interior surface of the louvered cover at the second end of the muffler housing. The pad itself is constructed of a SAE No. F-7 polyester felt. This specific material has a porosity that adequately silences the exhaust of the air motor and permits grease, oil and water exhausted from the air motor to pass through the pad without an appreciable increase in the resistance of the pad to the flow of exhaust through the pad. The pad also has a rigidity that contributes to avoiding compression of the pad due to the force of the exhaust from the air motor acting on the first planar surface of the pad.

The plurality of radial depressions and spoked ridges provided in the first end wall of the muffler housing disperse the exhaust supplied through the entrance port of the muffler housing over the first planar surface of the sound absorbing pad. This ensures a substantially even distribution of the exhaust flowing through all portions of the pad. Should the muffler be damaged and the sound absorbing pad become crushed against the entrance port of the muffler housing, the air motor exhaust delivered by the entrance port will not be concentrated at the area of the first pad surface defined by the diametric projection of the entrance port on the first pad surface. Rather, the exhaust will still be dispersed over the entire first planar surface of the pad by flowing through the plurality of radial depressions provided in the first end wall of the muffler housing.

The muffler housing is constructed of aluminum, magnesium, or some other metal or metal alloy that readily transfers heat through the muffler housing to avoid the icing up of any condensation that may form in the exhaust passageway leading to the entrance port of the muffler.

BRIEF DESCRIPTION OF THE DRAWINGS

Further objects and features of the present invention are revealed in the following detailed description of the preferred embodiments of the invention and in the drawing figures wherein.

DESCRIPTION OF THE PREFERRED EMBODIMENT

Figure 1:
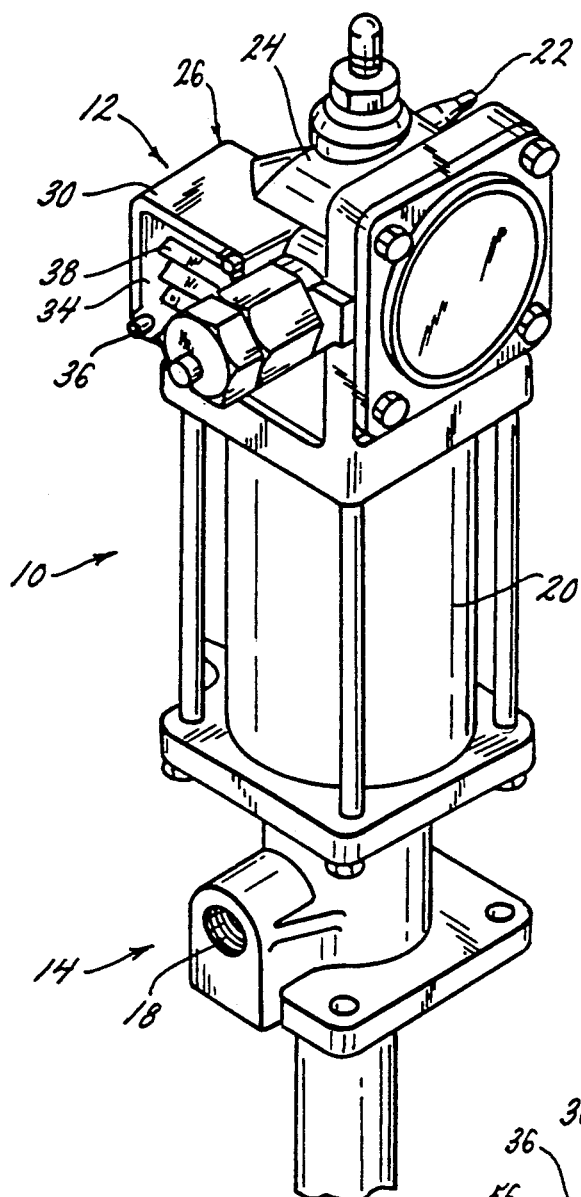
FIG. 1 is a perspective view of a compressed air driven motor with the subject sound absorbing muffler formed integrally with the air motor housing.

FIG. 1 shows a perspective view of a conventional compressed air driven motor 10 that makes up the operative environment of the sound absorbing muffler 12 of the present invention. The air driven motor 10 is operatively connected to a reciprocating pump 14. Air motors and reciprocating pumps of this type are well known in the art and will not be described in detail. The pump comprises an inlet fluid conduit 16 and an outlet fluid conduit 18. The air motor comprises a cylindrical housing 20 that contains the piston (not shown) of the motor. Compressed air is supplied to an inlet port 22 of the air motor. A valve mechanism (not shown) contained within the motor housing 24 alternately supplies the compressed air to opposite sides of the piston contained in the air motor cylinder 20. The compressed air causes the piston and the connecting rod (not shown) to reciprocate in the housing. The connecting rod of the piston is connected to the reciprocating pump and drives the pump to draw fluid through the inlet conduit 16 and supply fluid from the outlet conduit 18.

As compressed air is supplied to one side of the piston of the drive motor, the piston is displaced causing an increase in the cylindrical volume on the one side of the piston and a decrease in the cylindrical volume on the opposite side of the piston. The decrease in the cylindrical volume at the opposite side of the piston causes the air in that cylindrical volume to be exhausted from the air motor. This air is alternately exhausted from both sides of the piston during the operation of the air motor due to the reciprocating movement of the piston. This exhaust is supplied to and continuously passes through the sound absorbing muffler 12 of the present invention.

Figure 2:
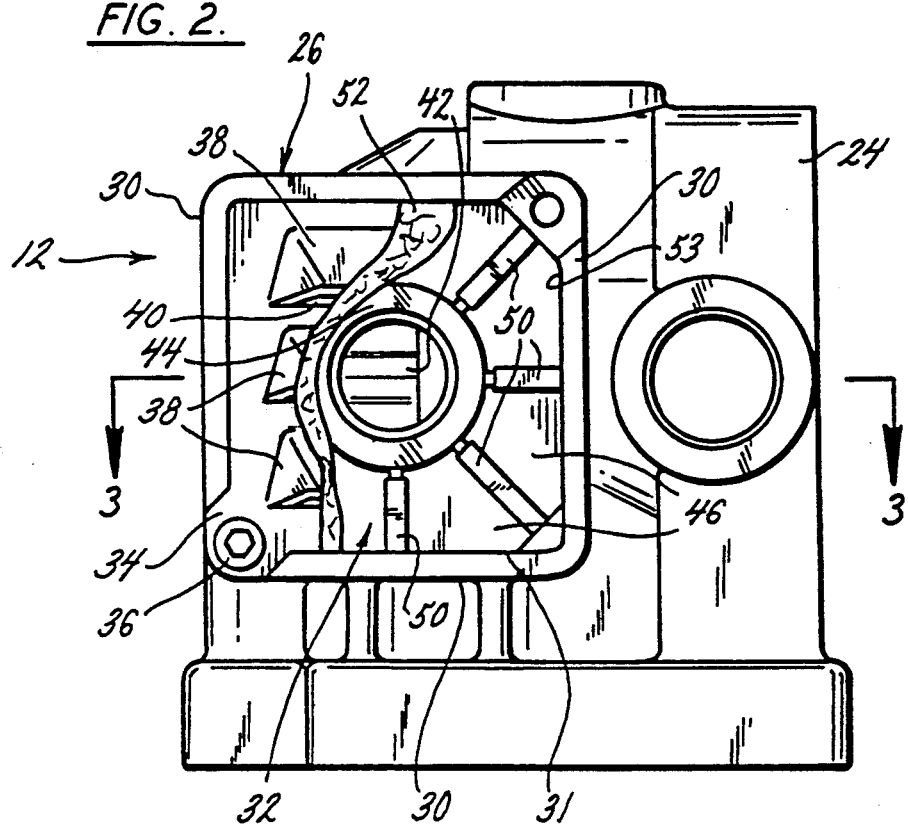
FIG. 2 is an elevation view, partially in section, of the sound absorbing muffler housing of the present invention.
Figure 3:
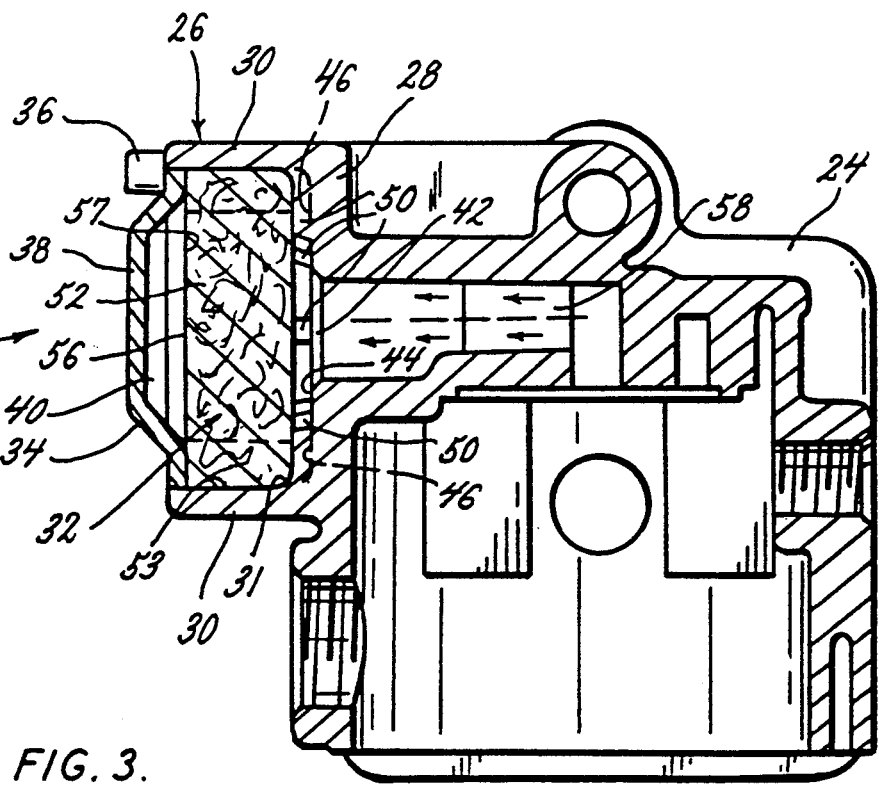
FIG. 3 is a plan view in section of the sound absorbing muffler of the present invention taken along the line 3—3 in FIG. 2.

FIGS. 2 and 3 show the structure of the air motor sound absorbing muffler of the present invention. The sound absorbing muffler 12 comprises a muffler housing 26. In the preferred embodiment shown in FIGS. 2 and 3, the muffler housing 26 is formed integrally with the housing 24 of the air motor 10. The muffler housing 26 comprises a first end wall 28 and four side walls 30. The four side walls 30 are arranged in a rectangular configuration and extend from the peripheral edge 31 of the first end wall 28 at right angles to the first end wall. The four side walls 30 and the first end wall 28 together form the interior volume 32 of the sound absorbing muffler.

A cover member 34 is provided at a second end of the muffler housing 26 and is releasably secured to the four side walls 30. The cover member 34 encloses the interior volume 32 of the muffler housing. The cover member 34 is secured to the side walls 30 of the muffler housing 26 by a pair of threaded fasteners 36 positioned at opposite corners of the cover member 34. The cover member 34 is provided with three louvers 38 that extend horizontally across the face of the cover member. Each louver 38 provided in the cover member 34 covers a horizontal slot 40 through the cover member 34. The slots 40 in the cover 34 communicate the interior volume 32 of the muffler housing with the exterior of the sound absorbing muffler. The slots 40 permit the escape of exhaust from the interior of the muffler housing 26. The louvers 38 direct the escaping exhaust from the muffler in a flow path angled downward and away from the muffler cover 34.

The first end wall 28 of the muffler housing comprises an entrance port 42 at the center of the end wall that receives exhaust from the air motor and directs the exhaust into the interior volume 32 of the muffler housing in a flow path that is perpendicular to the first end wall 28. A circular depression 44 is provided in the first end wall 28 and surrounding the entrance port 42. A plurality of depressions 46 are provided in the first end wall 28. The depressions 46 extend radially from the circular depression 44 in the end wall 28 to the peripheral edge 31 of the end wall. A plurality of spoked ridges 50 are also provided on the first end wall 28. Like the end wall depressions 46, the spoked ridges extend radially from the circular depression 44 in the end wall 28 to the peripheral edge 31 of the end wall and separate the end wall depressions 46 from one another.

A pad of sound absorbing material 52 is provided in the interior volume 32 formed by the side walls 30 and the first end wall 28, and enclosed by the muffler cover member 34. The pad 52 has a rectangular configuration and fits tightly into the rectangular configuration formed by the interior surfaces 53 of the four side walls 30. The pad also has first and second planar surfaces 54, 56. The first planar surface 54 of the pad abuts against the first end wall 28 of the muffler housing over its entire area. The second planar surface 56 of the pad 52 abuts against the interior surface 57 of the muffler cover member 34. The thickness of the pad 52 is chosen to ensure that the first planar surface 54 abuts against the first end wall 28, and the second planar surface 56 abuts against the interior surface of the muffler cover member 34. In the preferred embodiment, the thickness of the sound absorbing pad 52 is one inch and the pad is constructed from a SAE No. F-7 polyester felt. For optimum performance, the surface area of the first and second pad surfaces 54, 56 must be at least five times the area of the entrance port 42. In the preferred embodiment the first and second pad surface areas are eleven times the area of the entrance port 42.

In alternate embodiments the thickness of the pad may be different than one inch, and the pad may be constructed from a material other than SAE No. F-7 polyester felt so long as the porosity and the thickness of the material chosen provide sound absorbing and exhaust flow restricting properties that are substantially the same as the sound absorbing and exhaust flow restricting properties of a one inch thick pad of SAE No. F-7 polyester felt. In such alternate embodiments, the interior volume of the muffler housing must be dimensioned to accommodate the thickness of the pad of sound absorbing material without appreciably compressing the pad.

In operation, exhaust from the compressed air driven motor is channeled through the exhaust conduit 58 of the motor toward the entrance port 42 of the muffler. The exhaust passes through the entrance port 42 and is directed by the entrance port in a flow path perpendicular to the first planar surface 54 of the pad of sound absorbing material 52. The circular depression 44 and the end wall depressions 46 provided in the first end wall 28 of the muffler housing disperse the exhaust from the air motor over substantially the entire area of the first planar surface 54 of the pad of sound absorbing material 52. The dispersion of the exhaust over the first planar surface 54 in this manner evens out the volume of exhaust passing through any given section of the pad of sound absorbing material 52.

Should the muffler be damaged and the pad 52 become crushed against the entrance port 42, the exhaust will still be dispersed over the entire area of the first planar surface 54 of the pad 52 by the series of end wall depressions 46. This avoids a concentration of the exhaust in the portion of the pad 52 defined by the diametric projection of the entrance port 42 on the first planar surface 54 of the pad.

The exhaust, along with any grease, oil or water carried by the exhaust, passes through and is silenced by the pad of sound absorbing material 52. The porosity of the SAE F-7 polyester felt pad enables the small pad 52 to absorb substantially the same amount of exhaust noise as a larger pad of some types of sound absorbing material. The specific felt permits grease, oil or water carried by the exhaust to pass through the pad without being absorbed. Because the grease, oil or water is not absorbed, the pad does not swell and the porosity of the pad is not significantly diminished. The exhaust exiting the second planar surface 56 of the pad 52 is directed by the louvers 38 of the cover member 34 at the second end of the muffler housing in a direction angled away from the original flow path of the gas exiting the motor exhaust channel 58. The pad of sound absorbing material constructed from an SAE No. F-7 polyester felt adequately silences the exhaust from the air motor to conform to OSHA noise standards with an added factor of safety.

The muffler housing 24 is constructed of aluminum, magnesium, or some other metal or metal alloy that readily transfers heat. The muffler housing transfers the heat generated by the operation of the air motor through the entire muffler housing and prevents the formation of ice from condensed liquid in the motor exhaust channel 58 that could clog the porosity of the pad 52.

Figure 4:
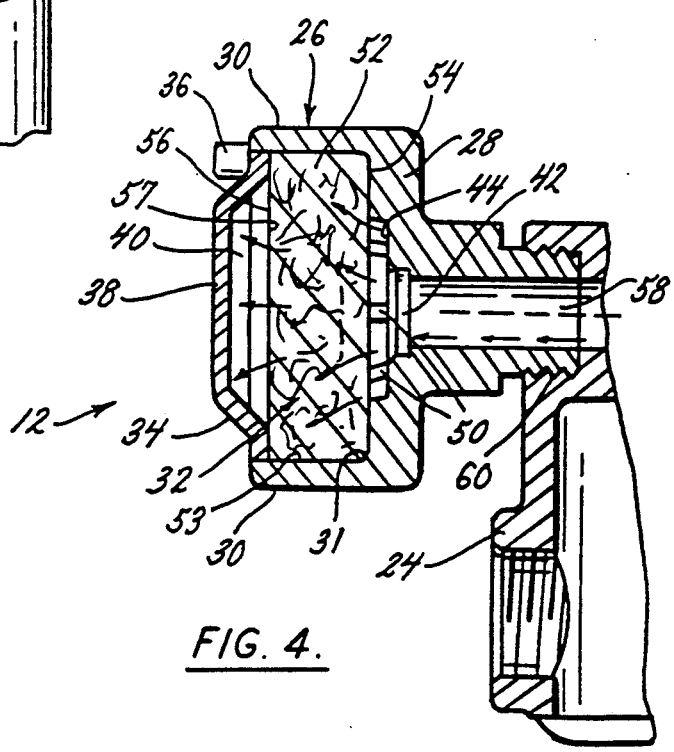
FIG. 4 is a plan view in section of an alternative embodiment of the present invention that may be retrofitted to an existing air motor.

FIG. 4 shows an alternate embodiment of the muffler of the present invention that is not formed integrally with the housing of an air motor. In this embodiment, the muffler housing 26 is secured to a pre-existing air motor housing 24 by a threaded fastening member 60 that is part of an exhaust conduit 62 extending from the entrance port 42 and the first end wall 28 of the muffler housing 26 to the housing 24 of the air motor 10. Aside from this difference, the first and second embodiments of the muffler function identically.

While the present invention has been described by reference to specific embodiments, it should be understood that modifications and variations of the invention may be constructed without departing from the scope of the invention defined in the following claims.

What is claimed is:

1. A sound absorbing muffler adapted to receive exhaust from a motor comprising:
   a muffler housing having a first end wall and a plurality of side walls, the plurality of side walls being connected to and extending from an outer peripheral edge of the first end wall so that the plurality of side walls and the first end wall define an interior volume of the muffler housing;
   an entrance port in the first end wall adapted to receive exhaust from a motor;
   a plurality of exhaust dispersing depressions in the first end wall surrounding the entrance port, the depressions extending radially from the entrance port across the first end wall to the outer peripheral edge of the first end wall;
   a plurality of spoked ridges on the first end wall surrounding the entrance port, the spoked ridges extending radially from the entrance port across the first end wall to the outer peripheral edge of the first end wall and separating the plurality of depressions in the first end wall from one another;
   a pad of sound absorbing material filling the interior volume defined by the plurality of side walls and the first end wall;
   a second end wall secured to the plurality of side walls opposite the first end wall and enclosing the interior volume defined by the plurality of side walls and the first end wall; and
   an exit means venting the interior volume of the muffler housing.

2. The muffler of claim 1 comprising:
   a circular depression in the first end wall surrounding the entrance port, the plurality of depressions and the plurality of spoked ridges extending radially from the circular depression.

3. The muffler of claim 1 comprising:
   the muffler housing being integral with a housing of a motor.

4. The muffler of claim 1 comprising:
   the pad of sound absorbing material being dimensioned to fit in and fill the interior volume defined by the plurality of side walls and the first end wall and enclosed by the second end wall without compressing the pad.

5. The muffler of claim 1 comprising:
   a plurality of parallel louvers extending across the second end wall.

6. The muffler of claim 1 comprising:
   the outer peripheral edge of the first end wall having a rectangular configuration, and the plurality of side walls including four side walls arranged in a rectangular configuration and extending at right angles to the first end wall.

7. The muffler of claim 1 comprising:
   the pad of sound absorbing material having first and second parallel planar surfaces on opposite sides of the pad, the first pad surface confronting the first end wall and the second pad surface confronting the second end wall.

8. The muffler of claim 7 comprising:
   the plurality of depressions in the first end wall being arranged to disperse exhaust received by the entrance port over an area of the first pad surface that is at least five times larger than an area of the entrance port.

9. The muffler of claim 7 comprising:
   the plurality of depressions in the first end wall arranged to dispense exhaust received by the entrance port over an area of the first pad surface that is at least eleven times larger than an area of the entrance port.

10. The muffler of claim 1 comprising:
    the entrance port being arranged to direct exhaust received from a motor into the interior volume defined by the plurality of side walls and the first end wall and enclosed by the second end wall in a flow path that is perpendicular to the first end wall.

11. The muffler of claim 1 comprising:
    the second end wall being releasably secured to the plurality of side walls by a pair of threaded fasteners.

12. The muffler of claim 1 comprising:
    the muffler housing being constructed of aluminum.

13. The muffler of claim 1 comprising:
    the muffler housing being constructed of magnesium.

* * * * *